No. 617,598. Patented Jan. 10, 1899.
G. S. NEELEY.
AUTOMATIC REGULATOR.
(Application filed July 28, 1897.)
(No Model.) 2 Sheets—Sheet 2.
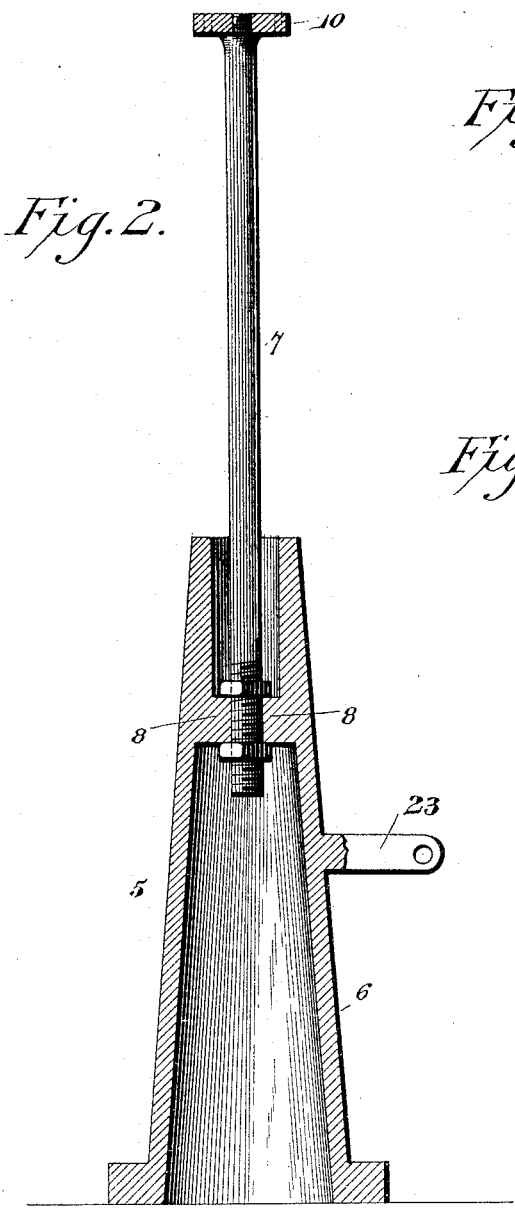
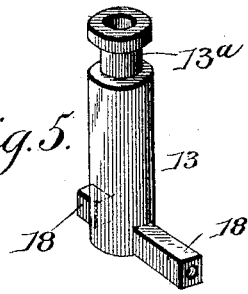
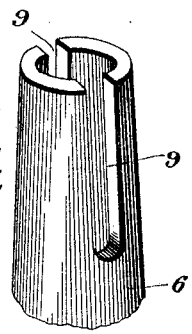
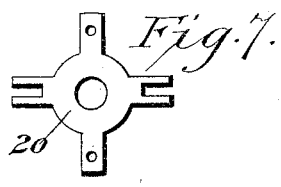
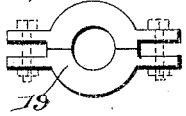
Witnesses
Jas. H. McCathran
H. J. Benihorf
Inventor
George S. Neeley
By his Attorneys,
C. A. Snow & Co.

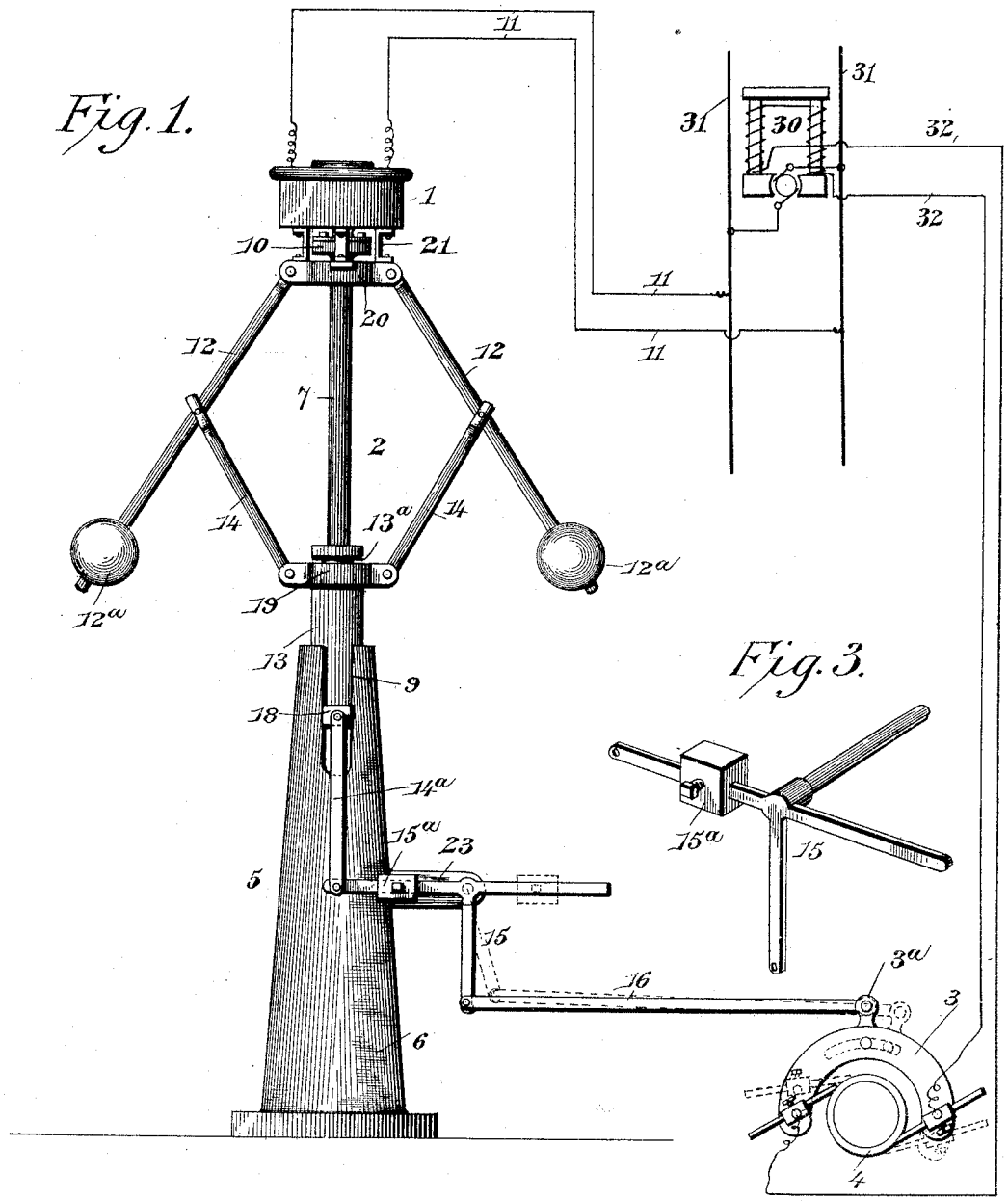

UNITED STATES PATENT OFFICE.

GEORGE S. NEELEY, OF PACIFIC, MISSOURI, ASSIGNOR OF ONE-HALF TO ALBERT KOPPITZ, OF SAME PLACE.

AUTOMATIC REGULATOR.

SPECIFICATION forming part of Letters Patent No. 617,598, dated January 10, 1899.

Application filed July 28, 1897. Serial No. 646,202. (No model.)

*To all whom it may concern:*

Be it known that I, GEORGE S. NEELEY, a citizen of the United States, residing at Pacific, in the county of Franklin and State of Missouri, have invented a new and useful Automatic Regulator, of which the following is a specification.

My invention relates to improvements in automatic regulators for alternating and direct current dynamos used for electric lighting and power purposes.

The object of the present invention is to provide an automatic regulator designed primarily for alternating-current dynamos to automatically maintain a constant electromotive force for any increase or decrease in the number of translating devices, such as lights, or for any variation in the power supplied with electric current from a dynamo equipped with my newly-invented regulator. In this class of generating dynamos it has long been desirable to provide an automatic regulator which will maintain a constant electromotive force for all fluctuations in the number of lights burning or current supplied for power purposes. To accomplish this end, it has been customary, in some instances, to resort to what is known as compound winding, which, however, is expensive and requires careful attention on the part of the operator or attendant after the dynamo is built and installed. In another instance a regulator has been employed to shunt more or less of the field-coils of the auxiliary exciting-motor usually employed in connection with alternating-current dynamos; but in this class of devices the regulator depends for its movement on the action of solenoid-coils, which are known by experiment to be unreliable. My improved regulator obviates the employment of such coils and other appliances and embodies in its construction devices actuated by centrifugal force and gravity. To utilize the forces of gravity and centrifugal action, it is necessary to combine said devices with a rotary mechanism, and to attain this end I provide my regulating system with a small induction-motor whose fields are wound for the same resistance as the primary circuit of the transformers used in the system in which is embraced the dynamo equipped with a regulator of my invention.

According to my invention I employ a small induction-motor, which is included in the external or working circuit of the dynamo in the same way as the transformers are included in said working circuit, and with this induction-motor is mechanically combined a centrifugal governor, which is mechanically and positively connected with the brush-holder and adjuster of the direct-current dynamo usually employed as an auxiliary to charge or excite the field-magnets of the dynamo.

It is proper to explain here that the regulation of the electromotive force of the dynamo is best accomplished, either by hand or by a rheostat, at the auxiliary or exciting direct-current generator, and in my present invention the induction-motor is included in the working or primary circuit of the dynamo, and the centrifugal governor is mechanically connected with this induction-motor, to be driven thereby, and is in like manner connected with the brush-holder of the exciting auxiliary generator for the dynamo; and the invention further consists in the novel combination of elements and in the construction and arragement of parts, which will be hereinafter fully described and claimed.

To enable others to understand my invention, I have illustrated the same in the accompanying drawings, forming a part of this specification, and in which—

Figure 1 is an elevation of my regulator, showing it operatively connected with the induction-motor and with the brush-carrier of of an auxiliary exciting-generator for a dynamo. Fig. 2 is a sectional elevation of the two-part column or post on which the induction-motor and the regulator are operatively mounted. Fig. 3 is a detail perspective view of the triple crank with the adjustable weight thereon. Fig. 4 is a fragmentary detail view of the upper part of the column or post to show the slot therein for the accommodation of the guide-lugs on the slidable sleeve of the regulator. Fig. 5 is a detail perspective view of the slidable sleeve forming a part of the regulator. Fig. 6 is a detail view, in elevation, of the induction-motor to be mounted on the post or column. Fig. 7 represents in plan the rotary collar, which is operatively connected with the rotary member of the induction-motor and which serves as the means for carrying the centrifugal governor. Fig. 8 is a detail view of the coupling between the governor-sleeve and the links which connect to the weighted arms of the governor.

Like numerals of reference denote corresponding parts in all the figures of the drawings.

In my system for automatically regulating the electromotive force of alternating-current dynamos I employ a small motor, (indicated at 1,) which is included in the working circuit of the dynamo whose electromotive force it is desired to control and regulate without reference to fluctuations in the load of the working circuit.

In Fig. 1 of the drawings I have shown diagrammatically the external working circuit at 31, to which the dynamo is connected in the usual way, and with the field-coils of this dynamo are connected the conductors 32, leading from the brushes of the auxiliary generator 4. The induction-motor 1 is connected by the leads or conductors 11 to the external or working circuit, and said motor 1 mechanically controls the centrifugal governor, which shifts the position of the brushes for the auxiliary generator 4. The induction-motor which I employ revolves at a speed dependent upon the electromotive force of the dynamo which furnishes the current to the working circuit and to the motor 1 in a branch of said circuit, and any increase above or decrease below a fixed electromotive force of the dynamo will cause the motor to increase or decrease its speed in direct proportion to the rise or fall in the electromotive force of the dynamo. Said induction-motor controls a centrifugal governor, (indicated in a general way at 2 in the drawings,) and said governor is mechanically connected with the brush-carrier 3 of the usual auxiliary exciting-generator, the commutator of which is indicated at 4 in the drawings, said auxiliary exciting-generator being connected in the usual way with the dynamo of the alternating-current type the electromotive force of the current of which it is desired to automatically control for all fluctuations of load.

In my regulator system for alternating dynamos the induction-motor 1 has its field-coils connected by a shunt or derived circuit in multiple arc with the mains of the external working circuit, which is supplied with the current of electrical energy from the alternating dynamo, so that the variation or fluctuation of the electromotive force in the working circuit affects the rotation of the induction-motor to cause the latter to rotate in unison with the dynamo. The rotary element of the induction-motor carries with it the rotary element of the centrifugal-governor mechanism and this governor mechanism is connected mechanically with the shiftable brushes of the auxiliary exciting-generator.

The induction-motor 1 may be of any suitable construction, and it is mounted upon the head of a vertical post or column 5. (Shown more clearly by Figs. 1, 2, and 4 of the drawings.) This column is in two parts—the base 6 and the spindle 7. The base 6 is of hollow form, with a transverse web or partition 8, and above this partition or web the column is slotted vertically and longitudinally, as at 9, said slots being at diametrically opposite lines of the upper part of the base 6. The spindle 7 is solid, with a threaded lower extremity, which is passed through an aperture in the web or partition 8 of the base 6, and this spindle is fixed solidly in the base by the jam-nuts $7^a$, fitted on the threaded part of the spindle and bearing against the web or partition 8 on the upper and lower sides thereof. This spindle 7 extends a suitable distance above the base 6, and its upper extremity carries a head 10 for supporting the induction-motor 1. This induction-motor consists of a stationary member and a rotary member, and the stationary member of said motor 1 is mounted in a suitable way upon the head of the fixed spindle forming a part of the upright or column. The rotary member of this induction-motor is arranged in a suitable way to rotate freely on the head of the spindle, and said rotary member of the induction-motor is operatively connected by mechanical devices with the centrifugal governor. The motor 1 is included directly in the primary circuit of the generator or dynamo, the wires of which are designated at 11 in Fig. 1, and the current from this primary circuit of the dynamo induces a current in the motor 1 sufficient to insure rotation of the movable member of the motor 1 in proportion to the electromotive force of the alternating-current dynamo and the rotation of the armature of the auxiliary current-exciting generator, whose commutator is indicated at 4 in Fig. 1.

The centrifugal governor 2 consists of weighted arms 12 12, a slidable sleeve 13, links 14, which operatively connect the slidable sleeve with the weighted arms, a triple crank 15, linked to the slidable sleeve, and a pitman between the triple crank and the brush-carrier 3 of the auxiliary exciting-generator for the dynamo.

The connection between the centrifugal governor and the rotary member of the induction-motor 1 is effected by means of a rotary collar or carrier 20 and the brackets 21. The rotary collar or carrier 20 is shown in detail in Fig. 7 of the drawings as consisting of a single casting with a central perforation and a series of radial arms, and said carrier is loosely fitted on the spindle 7 below the head on which the motor 1 is mounted. The brackets 21 are attached rigidly to the rotary member of the motor 1 and to the arms of the rotary carrier 20, and thus the carrier is connected with the movable part of the motor 1 to rotate therewith. Two of the arms of the rotary carrier are slotted or notched to accommodate the upper extremities of the arms 12 of the centrifugal governor, and said arms and the carrier are connected together by suitable pivots, as shown by Fig. 1. The arms 12 carry the weights 12$^a$, which may be attached to the arms in any suitable way, and the links 14 are pivoted to the weighted arms at points between the weights thereof and the pivotal attachment of said arms to the rotary carrier 20.

The slidable sleeve 13 is bored out to accurately fit the spindle 7, on which the sleeve is fitted to slide loosely and freely; but this sleeve is prevented from having rotary movement on the spindle by suitable connections with the base 6. To this end, I provide the sleeve with the offstanding lugs 18, which project therefrom at diametrically opposite points and these lugs fit snugly in the vertical and longitudinal slots provided in the upper end of the hollow base 6, whereby the sleeve is limited to move endwise on the spindle by its connections with the base; but the sleeve cannot have rotary movement with the weighted arms and the carrier connected with the rotary member of the induction-motor 1. The weighted arms 12 and the slidable sleeve 13 are operatively connected by the collar 19, which is fitted loosely to the slidable sleeve 13 and to which are attached the inner ends of the links 14. This collar 19 is in two parts to enable it to be readily applied to the sleeve 13 and to provide for the pivotal attachment of the links 14 thereto; but the collar is operatively connected to the slidable sleeve by fitting in an annular groove or recess 13$^a$, which is produced in the protruding upper end of said slidable sleeve 13, as shown by Fig. 1.

The triple crank 15 is pivoted to an arm 23, which extends from one side of the base 6 of the upright or column, and said crank has two of its arms in alinement with each other, while its third arm depends from the alined arms, as shown by Figs. 1 and 3. One of the arms of this triple crank is connected to the lug 18 of the slidable sleeve 13 by a pitman 14$^a$, and the depending arm of said triple crank is also connected to a pitman 16, which has its other end pivoted to a lug 3$^a$ on the shiftable brush-carrier of the auxiliary exciting-generator for the dynamo. The triple crank carries an adjustable weight 15$^a$, which is applied to the arm of the crank between the attachment of the link 14$^a$ and the pivot of said crank, and this weight is adjusted to control the operation of the centrifugal governor so it will regulate the brushes of the exciting-generator to maintain the desired electromotive force in the current generated by the dynamo. Any movement of this weight away from the pivot or fulcrum of the triple crank will cause the regulator to maintain a higher electromotive force for each adjustment of the weight on the triple crank; but if the weight is moved toward the fulcrum of said triple crank a corresponding decrease in the electromotive force of the current is obtained. If the weight is moved to its extreme position toward the pivot of the triple crank and the dynamo should generate too high an electromotive force, the weight can be removed and applied to the other horizontal arm of the triple crank on the opposite side of the fulcrum thereof, as shown by dotted lines in Fig. 1, in which position the weight will cease to resist the centrifugal force of the weighted arms when the motor 1 is in operation; but, on the contrary, the weight will assist or tend to throw the weighted arms outward to shift the brushes, so as to weaken the electromotive force of the current generated by the dynamo. In practice, however, the weights on the arms of the governor will be made sufficiently light to obviate removal and shifting of the weight to the opposite horizontal arms of the triple crank; but the weight will remain in position on the arm of the triple crank to which the link 14$^a$ is connected, sufficient room being provided on said arm of the triple crank for the necessary adjustment of the weight thereon to meet the requirements of service.

The operation may be described as follows: When the dynamo and regulator are not in use, the brushes of the auxiliary exciting-generator will rest in their extreme positions. (Shown by dotted lines in Fig. 1.) When the dynamo is started and generates sufficient current, the motor 1 is rotated and the centrifugal governor is carried with the rotary member of said motor, the action of the governor gradually increasing with the motor up to the normal condition. As the motor 1 gradually approaches its normal speed the governor-arms 12 will be thrown out and raised up by centrifugal force and raise the sleeve to actuate the triple crank through the described connections and thus adjust the brush-carrier to move the brushes until an equilibrium is attained between the attraction of gravity and the centrifugal force. When this point of equilibrium is attained, the motor 1 will cease to gain in speed, because any additional movement outward of the balls and weighted arms tends to further shift the brush-carrier to move the brushes to weaken the current. We will suppose that the working circuit carries a load of five hundred incandescent lights and that the dynamo is regulated to deliver a current the electromotive force of which is one thousand volts. If one hundred of the five hundred lights should be turned out, the electromotive force of the current will immediately rise from one thousand volts to ten hundred and fifty volts. This increase of fifty volts will increase the speed of the induction-motor 1 in the circuit, and thus the governor is actuated to raise the sleeve and cause the latter to adjust the brush-carrier to bring the brushes to a point that will bring the electromotive force of the current back to one thousand volts. Consequently the speed of the induction-motor is reduced correspondingly to the decrease in the voltage or electromotive force of the current. If one hundred lights were again turned on, the effect would be the reverse to that described, in that the electromotive force would be decreased to nine hundred and fifty volts, which would result in a corresponding decrease of the speed of the motor 1 and cause the brushes in the carrier 3 to be shifted to a point that would cause the electromotive force to be raised from nine hundred and fifty to one thousand volts.

The application of my regulator to a dynamo does not interfere with the usual methods of regulation of the electromotive force of the dynamos of the alternating-current type, which ordinary methods of regulating the dynamo may be resorted to in case of accident to my improved regulator.

My improved regulator is efficient and reliable in operation, involves minimum expense in its operation and installation, and does not require skilled attention to keep it in order.

I do not wish to confine my regulator to the shifting of the exciter-brushes alone; but my regulator may employ any means which is the equivalent of shifting the exciter-brushes.

A regulator embodying my invention operates to maintain a uniform electromotive force without regard to any irregularity in the speed of the dynamo due to a defective engine-governor, as any increase or decrease in the speed of the dynamo will have the same effect, increasing or decreasing the electromotive force of the current the same as turning on or off a number of lights would have.

I am aware that changes in the form and in the minor details of construction to suit the different makes of dynamos can be made without departing from the spirit or sacrificing the advantages of my invention.

Having thus fully described my invention, what I claim as new, and desire to secure by Letters Patent, is—

1. In an automatic regulator, the combination of a column or post, an induction-motor mounted thereon and included in the primary circuit of a dynamo or generator, a centrifugal governor having its rotary parts connected with the rotary member of said induction-motor and its slidable sleeve guided on said column or post, an auxiliary exciting-generator for the dynamo, and mechanical connections between the sleeve of said governor and the shiftable brush-carrier of the exciting-generator, as and for the purposes described.

2. In an automatic regulator, the combination of an induction-motor included in the primary circuit of a dynamo, an auxiliary exciting-generator for said dynamo, an automatic governor having its rotary parts carried by the rotary member of said induction-motor and a sleeve limited to slidable movements, a triple crank carrying an adjustable weight, and link connections between the triple crank and the governor-sleeve and the shiftable brush-carrier of the auxiliary generator, as and for the purposes described.

3. In an automatic regulator, the combination with an induction-motor included in the primary circuit of a dynamo, and an auxiliary exciting-generator for said dynamo, of a column or post upon which the induction-motor is mounted, a carrier rigidly connected to the rotary member of said induction-motor, a governor-sleeve slidably fitted on the column or post, governor-arms pivoted to the carrier and linked to said sleeve, and a crank linked to the governor-sleeve and to the brush-carrier of the auxiliary exciting-generator, as and for the purposes described.

4. In an automatic regulator, the combination with an induction-motor included in the primary circuit of a dynamo, and an auxiliary exciting-generator for said dynamo, of a two-part column or post having, in the base member thereof, vertical slots, a rotary carrier loosely fitted on the spindle of the column and attached rigidly to the rotary member of said induction-motor, governor-arms pivoted to the carrier, a governor-sleeve fitted to the spindle and having means to slide in the slots of the base, connections between the sleeve and the governor-arms, and a crank linked to the governor-sleeve and also linked to the shiftable brush-carrier of the exciting auxiliary generator, as and for the purposes described.

In testimony that I claim the foregoing as my own I have hereto affixed my signature in the presence of two witnesses.

GEO. S. NEELEY.

Witnesses:
 LUCIE BOOTH,
 Mrs. J. BOOTH.